March 18, 1930. L. E. EDWARDS 1,750,995
ENGINE VALVE
Filed May 10, 1927
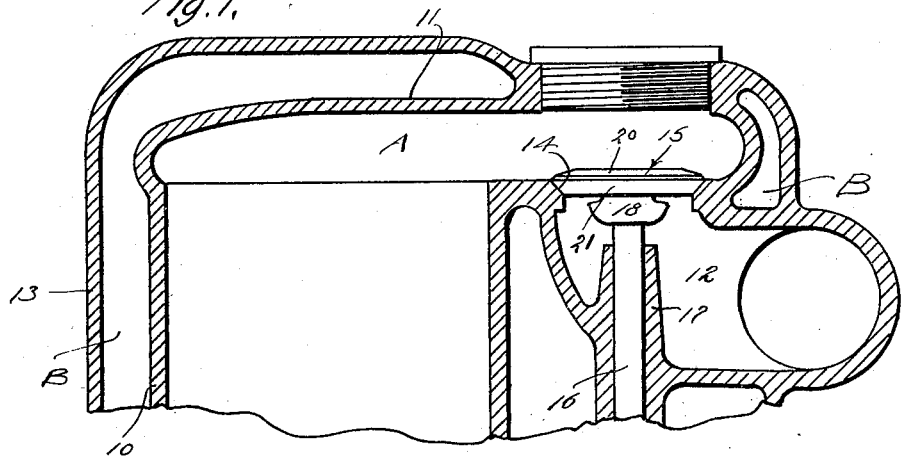
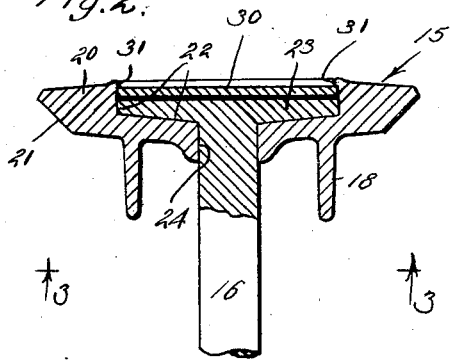
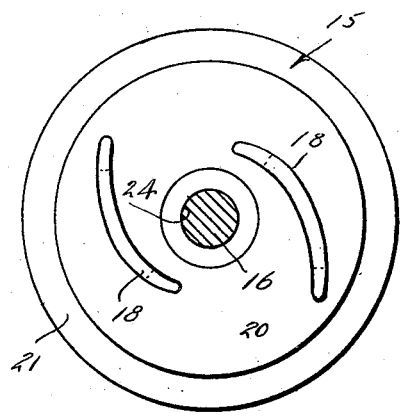
Inventor
Lewis E. Edwards
by his Attorney Patented Mar. 18, 1930

1,750,995

UNITED STATES PATENT OFFICE

LEWIS E. EDWARDS, OF HUNTINGTON PARK, CALIFORNIA

ENGINE VALVE

Application filed May 10, 1927. Serial No. 190,190.

This invention has to do with an engine valve, and it is a general object of the invention to provide an effective, improved valve useful in engines such as internal combustion engines.

The valve provided by this invention is useful, generally, in engines of various types, being particularly suited for use in internal combustion engines. For purpose of example, I will refer to the invention as applied to a gasoline engine of the general type employed in automobiles, and the like, it being understood that such reference is not to be construed as limiting the scope of application of the invention. The valves employed in internal combustion engines are subjected to high temperatures and have to operate in the presence of carbon deposited by the engine fuel. Valves of the poppet type are generally employed in internal combustion engines, and are ground or otherwise fitted to their seats. The ordinary engine valve remains in a constant rotative position with reference to its seat, there being no flexibility between the valve and seat allowing it to work or vary in position to wear uniformly and avoid warping, pitting, and other common troubles.

It is an object of this invention to provide a valve which is free to vary its position with reference to its seat and thus overcome many of the troubles common to engine valves.

It is a further object of this invention to provide a valve embodying means whereby it is turned or rotated with reference to its seat during the operation of the engine.

Another object of this invention is to provide a simple, practical and effective construction and arrangement of parts for a valve of the character above mentioned.

The various objects and features of the invention will be best and more fully understood from the following detailed description of a typical form and application of the invention, throughout which description reference is had to the accompanying drawings, in which:

Fig. 1 is a detailed, sectional view of the upper end portion of an engine cylinder, showing a valve embodying this invention arranged in connection with the cylinder;

Fig. 2 is an enlarged, detailed, sectional view of the valve provided by this invention; and Fig. 3 is a view taken as indicated by line 3—3 on Fig. 2.

For purpose of example, I have disclosed my improved valve in a typical application to an engine of the type or form commonly employed in motor vehicles, and the like. In the drawings, I have shown an engine cylinder 10, a cylinder head 11 closing the upper end of the cylinder and forming a combustion chamber A, a port 12 at one side of the cylinder 10 opening upwardly into the combustion chamber A, a jacket 13 around the parts just described forming a space B for cooling water and various other parts common to engines of the type mentioned. In the drawings, I have shown only one valve in connection with the cylinder, it being understood, however, that the cylinder may be fitted or provided with as many valves as may be desired or necessary. Further, I have shown a common or typical type of engine construction known, generally, as the L-head type. A valve seat 14 is provided in the combustion chamber at the point of connection of the port 12 and chamber. The seat 14 is made to accommodate the valve head 15, the chamber A being proportioned so that the valve head 15 operates within the chamber. The valve stem 16 projects downwardly from the head 15 through the port 12 and through a suitable bearing or mounting 17.

In accordance with standard construction, the port 12 curves downwardly and outwardly from its point of communication with the chamber A so that the flow or passage of gases or vapors between the port and cylinder is substantially radial with reference to the cylinder 10, the deflection from the radial direction being made as little as possible.

In accordance with my present invention, the valve head 15 is mounted for movement or rotation on the stem 16. In the preferred construction, the head is provided with propelling blades or vanes 18. The valve head 15 may correspond, generally, to the head of an ordinary poppet valve; for instance, it may include the usual flat disc-like body 20, having a finished face 21 at its periphery to co-operate with the seat 14. In accordance with standard practice, I have shown the seat 14 and face 21 formed at an angle. In accordance with my invention, a round central opening or socket 22 is provided in the body 20 of the head from its upper side to carry a disc shaped enlargement 23 on the upper end of the valve stem 16. The stem 16 enters or extends upwardly into the socket 22 through a central opening 24 provided through the body to rotatably pass the stem. The enlargement 23 on the upper end of the stem fits the socket 22 with sufficient clearance to allow free rotation between the head and stem. In accordance with my invention, the body of the head and the enlargement on the stem are held in the proper relation by means of a closure 30 for the top or outer portion of the socket 22. In the form of the invention shown in the drawings, I have disclosed the closure 30 in the form of a plug fitted tightly in the outer part or mouth of the socket 22. The plug may be made tight in the socket in various ways obvious to those familiar with the art. For purpose of example, I have shown the plug held in place by rolling or turning the edge portion 31 of the socket inwardly to extend over the plug, as clearly shown in Fig. 2 of the drawings.

Propelling vanes 18 may, in accordance with my invention, be provided on one side of the head, for example, on the under or lower side, as shown in the drawings. In accordance with the broader principles of my invention, I may provide one or more vanes 18 and I may fashion or design the vanes in various manners, it being essential only that the vanes be such as to be acted on by the flow past the valve so that the head is turned or rotated with reference to the seat. Further, it is to be understood that the vanes may be applied to, or connected with, the head in various manners, as circumstances may require. In practice, I prefer to form the vanes integral with the head and to make them of considerable extent and comparatively thin so that they are effective in radiating heat as well as in propelling the head. In the particular form of the invention shown in the drawings, I have shown the head provided on its under side with two propelling vanes 18. I have shown the vanes arcuate in form. Each vane extends from a point close to the stem radially and circumferentially to a point close to the periphery of the head. The vanes are, of course, preferably arranged symmetrically so that the construction is balanced.

From the foregoing description, it is believed that the operation and advantages of the invention will be fully understood. When the valve is in use, its head functions substantially the same as the head of an ordinary poppet valve except that instead of being rigid on its stem and remaining in a fixed rotative position with reference to its seat, it is free to fit the seat and to turn relative to the seat. When the head is provided with propelling vanes, it is turned or rotated by the flow of vapors or gases acting on the vanes so that the rotative relation of the head and seat changes. This rotation of the head of the valve is effective in preventing warping in that it prevents any one part of the valve becoming overheated. Further, this rotation of the head has been found effective in preventing carbon from becoming deposited on the seat and face. It will be obvious that the propelling vanes on the head are effective in radiating heat from the head and thus operate to prevent over-heating of the valve. I have found by actual use that my present invention provides a valve which not only seats effectively and tightly, but also operates without burning, warping or becoming pitted.

Having described only a typical preferred form of my invention, I do not wish to limit myself to the specific details set forth, but wish to reserve to myself any changes or variations that may appear to those skilled in the art or fall within the scope of the following claims.

Having described my invention, I claim:

1. A valve of the character described, including a stem, a head having a socket in one side, an enlargement on the stem fitting said socket for rotation, and a plug in the mouth of the socket retaining the enlargement in the socket, the edge of the socket being turned to hold the plug.

2. A valve of the character described including a stem, a head having a socket in its upper side, a vane projecting from the under side of the head, an enlargement on the upper end of the stem rotatably carried in the socket, and a plug in the socket retaining the enlargement in the socket, the edge of the socket being turned to hold the plug.

In witness that I claim the foregoing I have hereunto subscribed my name this 21st day of April, 1927.

LEWIS E. EDWARDS.